United States Patent
Baggett et al.

(10) Patent No.: US 9,940,359 B2
(45) Date of Patent: Apr. 10, 2018

(54) DATA-PARTITIONED SECONDARY INDEX (DPSI) PARTITION LEVEL JOIN

(71) Applicant: International Business Machines Corporation, Armonk, NY (US)

(72) Inventors: Brian L. Baggett, Renton, WA (US); Michael A. Chang, San Jose, CA (US); Shuanglin Guo, Cupertino, CA (US); Ou Jin, San Jose, CA (US); Terence P. Purcell, Springfield, IA (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 14/286,783

(22) Filed: May 23, 2014

(65) Prior Publication Data

US 2015/0339350 A1 Nov. 26, 2015

(51) Int. Cl.
  *G06F 7/00* (2006.01)
  *G06F 17/30* (2006.01)
  *G06F 13/14* (2006.01)

(52) U.S. Cl.
  CPC .. *G06F 17/30498* (2013.01); *G06F 17/30339* (2013.01)

(58) Field of Classification Search
  CPC ......... G06F 17/30445; G06F 17/30498; G06F 17/30321; G06F 17/30466; G06F 17/30336; G06F 17/30864; G06F 17/30625; G06F 17/30477; G06F 17/30286; G06F 17/30339; G06F 17/30592; G06F 17/30; G06F 17/30595
  USPC ......... 707/764, 741, E17.002, E17.089, 737, 707/745, 747, 999.006, 999.002, 706, 707/769, 999.03, E17.039, 999.008, 707/E17.032, E17.044, 714, 715, 607, 707/999.004, 748, 754, 758, 766, 707/999.005, 999.1
  See application file for complete search history.

(56) References Cited

U.S. PATENT DOCUMENTS

| | | | | |
|---|---|---|---|---|
| 5,241,648 | A | * | 8/1993 | Cheng ............... G06F 17/30498 |
| 5,758,146 | A | * | 5/1998 | Schiefer ............ G06F 17/30321 707/715 |
| 5,797,000 | A | | 8/1998 | Bhattacharya et al. |
| 6,263,331 | B1 | * | 7/2001 | Liu ..................... G06F 17/3048 |
| 6,834,279 | B1 | * | 12/2004 | Chiang ............. G06F 17/30463 |
| 6,957,222 | B1 | * | 10/2005 | Ramesh ............ G06F 17/30466 |

(Continued)

OTHER PUBLICATIONS

Mell, P. and T. Grance, "Effectively and Securely Using the Cloud Computing Paradigm", NIST, Information Technology Laboratory, Oct. 7, 2009, Total 80 pages.

(Continued)

*Primary Examiner* — Heather Herndon
*Assistant Examiner* — Cecile Vo
(74) *Attorney, Agent, or Firm* — Janaki K. Davda; Konrad, Raynes, Davda & Victor LLP

(57) ABSTRACT

Provided are techniques for a Data-Partitioned Secondary Index (DPSI) partition level join. While using a Data-Partitioned Secondary Index (DPSI) to perform a join of an outer table and an inner table, a different task from multiple tasks is assigned to each partition of the inner table. With each task, a join is performed of the outer table and the assigned partition of the inner table using the DPSI to generate results. The results from each different task are merged.

15 Claims, 6 Drawing Sheets

(56) References Cited

U.S. PATENT DOCUMENTS

| | | | | |
|---|---|---|---|---|
| 7,080,072 B1* | 7/2006 | Sinclair | | G06F 17/30339 |
| 7,085,769 B1* | 8/2006 | Luo | | G06F 17/30445 |
| 7,103,590 B1* | 9/2006 | Murthy | | G06F 17/30483 |
| 7,146,365 B2* | 12/2006 | Allen | | G06F 17/30336 |
| 7,454,422 B2* | 11/2008 | Chan | | G06F 11/2033 |
| 7,873,629 B1* | 1/2011 | Morris | | G06F 17/30442 |
| | | | | 707/713 |
| 7,890,480 B2* | 2/2011 | Barsness | | G06F 17/3033 |
| | | | | 707/702 |
| 7,974,961 B2* | 7/2011 | Barbarek | | G06F 17/30339 |
| | | | | 707/705 |
| 8,321,420 B1* | 11/2012 | Sinclair | | G06F 17/30321 |
| | | | | 707/741 |
| 8,380,699 B2* | 2/2013 | Al-Omari | | G06F 17/30474 |
| | | | | 707/713 |
| 8,600,994 B1* | 12/2013 | Xu | | G06F 17/30017 |
| | | | | 707/737 |
| 8,719,307 B2* | 5/2014 | Surtani | | G06F 17/30949 |
| | | | | 707/693 |
| 9,031,826 B2* | 5/2015 | Carroll | | G06F 17/5022 |
| | | | | 703/2 |
| 9,171,044 B2* | 10/2015 | Schleimer | | G06F 17/30474 |
| 9,223,627 B2* | 12/2015 | Zakashansky | | G06F 9/5033 |
| 2004/0220930 A1 | 11/2004 | Finlay et al. | | |
| 2010/0161569 A1* | 6/2010 | Schreter | | G06F 17/30327 |
| | | | | 707/696 |
| 2012/0047158 A1* | 2/2012 | Lee | | G06F 17/30469 |
| | | | | 707/759 |

OTHER PUBLICATIONS

Mell, P. and T. Grance, "The NIST Definition of Cloud Computing (Draft)", National Institute of Standards and Technology, Jan. 2011, Total 7 pages.

\* cited by examiner

DATA-PARTITIONED SECONDARY INDEX (DPSI) PARTITION LEVEL JOIN

FIELD

Embodiments of the invention relate to improving join performance of a partitioned index. In particular, embodiments relate to a Data-Partitioned Secondary Index (DPSI) partition level join.

BACKGROUND

As technology advances, partitioned tablespaces are widely adopted as an effective way to manage larger volumes of data.

On a partitioned tablespace, there are two common types of secondary indexes that a user may create: 1) Non-Partitioned (Secondary) Index (NPI or NPSI, and also referred to as a global index by some Database Management Systems (DBMSs)) or 2) a Data-Partitioned Secondary Index (DPSI, also referred to as a local index by some DBMSs). NPI may be described as one massive index created that spans all partitions. DPSI may be described as a group of many smaller indexes, where one index is created for each partition. Comparing the two types of secondary indexes, DPSI allows the user to manage the index and data at the partition level. Therefore, DPSI provides better data availability and better utility performance.

DPSI was first introduced to improve data availability during utility maintenance. With conventional systems, in terms of query performance, a DPSI is generally not as effective as an NPI. As a result, users can not fully adopt DPSI to take advantage of its utility benefits. Typically, customers use NPIs to maintain query performance.

The following is an example Structured Query Language (SQL) statement:

```
SELECT *
FROM    CUSTOMER C,
        AREACODES A
WHERE   C.STATE = A.STATE
```

With the above SQL statement, there is a 2-table join between tables CUSTOMER and AREACODES, and the join predicate is CUSTOMER.STATE=AREACODES.STATE. For this example, a DPSI is created on AREACODES.STATE. For each probing value from the outer table (CUSTOMER.STATE), processing stripes through multiple partitions of the inner table (AREACODES.STATE) to find qualified rows. Then, the striping pattern is repeated for each next probing from the outer table. Because of this striping pattern, there is no sequential pattern detection, the benefit of index look-aside is decreased, and random Input/Output (I/O) is increased, which leads to more Central Processing Unit (CPU) getpage calls. Then, the query suffers from longer response time and CPU time.

This is a random I/O problem related to a standard nested loop join. Thus, customers keep the NPIs around in order to maintain optimal query performance for joins. This limits the adoption of DPSIs for customers with large partitioned tables.

However, there are potential solutions to avoid random I/O on the inner partitioned table by using other join methods such as Hash Join or Merge-Scan (Sort-Merge) Join. However, these join techniques may require significant resources given that they require a materialization of the inner table for joining very large tables. Thus, existing hash join or merge scan join may not scale due to insufficient resources or due to reprocessing the inner table to accommodate insufficient memory (as is common with hash join).

Some systems offer partition level join operations involving hash join that support bushy-tree join permutation logic or DBMSs that provide a comprehensive hash join implementation.

SUMMARY

Provided is a method for a Data-Partitioned Secondary Index (DPSI) partition level join. The method comprise, while using a Data-Partitioned Secondary Index (DPSI) to perform a join of an outer table and an inner table, assigning, with a processor of a computer, a different task from multiple tasks to each partition of the inner table; with each different task, performing a join of the outer table and the assigned partition of the inner table using the DPSI to generate results; and merging the results from each different task.

Provided is a computer system for a Data-Partitioned Secondary Index (DPSI) partition level join. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: while using a Data-Partitioned Secondary Index (DPSI) to perform a join of an outer table and an inner table, assigning a different task from multiple tasks to each partition of the inner table; with each different task, performing a join of the outer table and the assigned partition of the inner table using the DPSI to generate results; and merging the results from each different task.

Provided is a computer program product for a Data-Partitioned Secondary Index (DPSI) partition level join. The computer program product comprising a computer readable storage medium having program code embodied therewith, the program code executable by at least one processor to perform: while using a Data-Partitioned Secondary Index (DPSI) to perform a join of an outer table and an inner table, assigning, by the at least one processor, a different task from multiple tasks to each partition of the inner table; with each different task, performing, by the at least one processor, a join of the outer table and the assigned partition of the inner table using the DPSI to generate results; and merging, by the at least one processor, the results from each different task.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
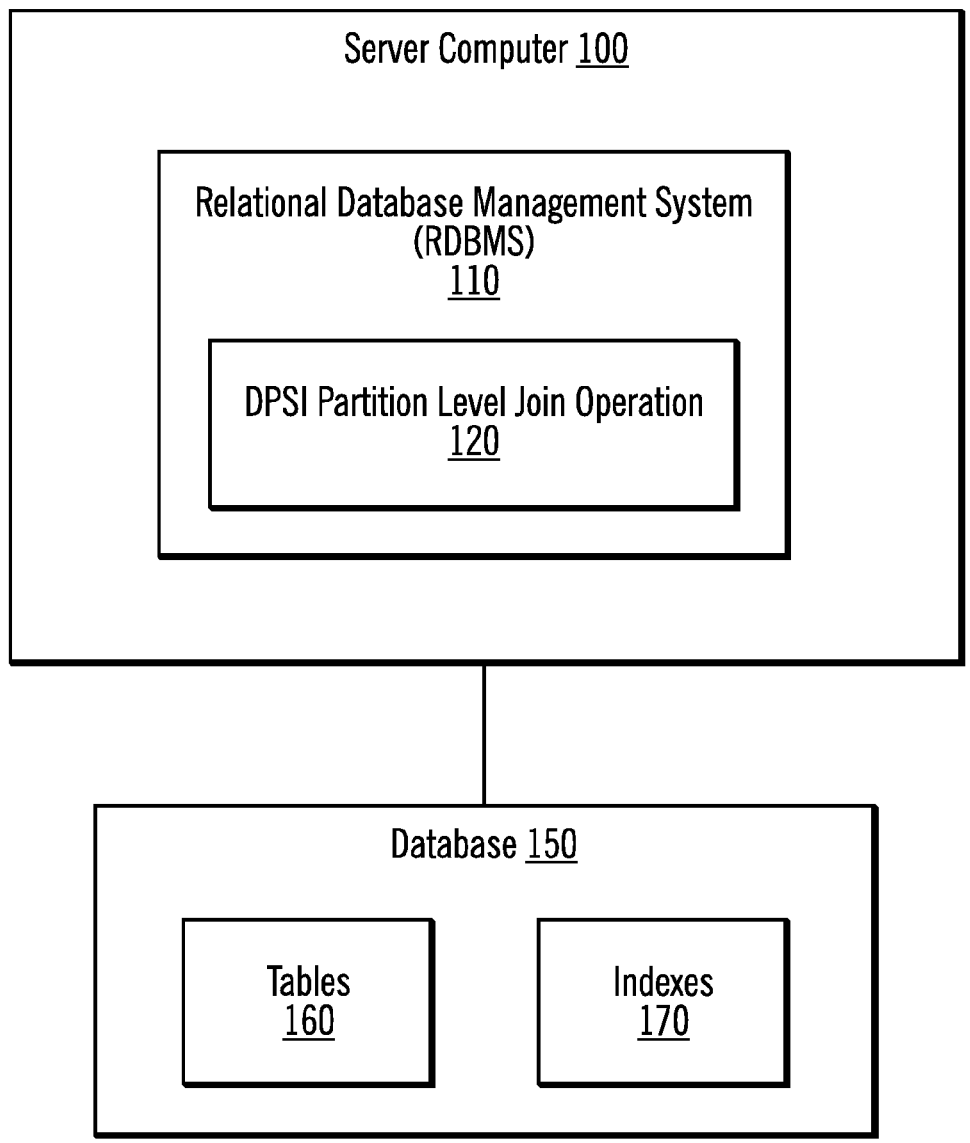
FIG. 1 illustrates, in a block diagram, a computing environment in accordance with certain embodiments.

FIG. 1 illustrates, in a block diagram, a computing environment in accordance with certain embodiments. A server computer 100 includes a Relational Database Management System (RDBMS) 110. The RDBMS 110 implements a DPSI partition level join operation 120 (which may be referred to as a "part-level" join operation). The server computer 100 is coupled to a database 150. The database 150 includes tables 160 and indexes 170.

Embodiments provide the DPSI partition level join operation 120 to join on a DPSI index. The DPSI partition level join operation 120 allows join on a DPSI index to be performed at a partition level. The DPSI partition level join operation 120 also allows multiple joins, one for each partition, running in parallel.

The DPSI partition level join operation 120 limits the join on the DPSI index to one partition at a time. Therefore, the DPSI partition level join operation 120 avoids the striping pattern caused by accessing multiple partitions. By limiting to processing 1 partition at a time, the DPSI partition level join operation 120 is able to keep a sequential pattern within each partition, which brings query performance benefits associated with sequential access instead of random access. This is especially true when there is a partition level DPSI that has a high degree of clustering. If the DPSI has poor clustering, then access to the index will be sequential using the DPSI partition level join operation 120, but access to the data pages may be random. In certain embodiments, this may be overcome by using a hybrid join.

For scenarios in which there is no efficient index for the join, then hash join or merge-scan join may be used. For either join technique, the partition level approach may also be employed to break up the join into more manageable pieces that can execute serially or concurrently (with parallelism). To avoid materialization of large individual partitions, it is possible to flip the join order such that a partition level tablespace scan is used on the large partitions to become the outer tables. The ability to flip the join sequence overcomes a limitation with available join sequences considered by DBMSs that employ the left-tree deep join permutation logic. In certain embodiments, such a requirement to be able to flip the join sequence may not be required for DBMSs employing bushy-tree join permutation logic. In certain embodiments, processing the entire partition is not preferred when the outer/composite provides good filtering.

In certain embodiments, employing the DPSI partition level join operation 120 can make DPSI performance comparable or better than NPI, or allow joins to perform efficiently and with the least amount of resources. These approaches allows users to decrease their reliance on NPIs for optimal query performance.

In certain embodiments, the DPSI partition level join operation 120 performs the join one partition at a time. When DPSI is used to join an inner table, the join will be performed as multiple joins, each by a child task that joins the outer table to one partition of the inner table. The join results from all child tasks are merged in the completion of the DPSI partition level join operation 120.

With the DPSI partition level join operation 120, since the join is kept within each partition, the data striping pattern is avoided. Each join is able to preserve sequential prefetch, as well as, index look-aside while accessing the inner partition. Furthermore, the joins to multiple partitions are handled by child tasks running in parallel. This further reduces query response time.

Figure 2:
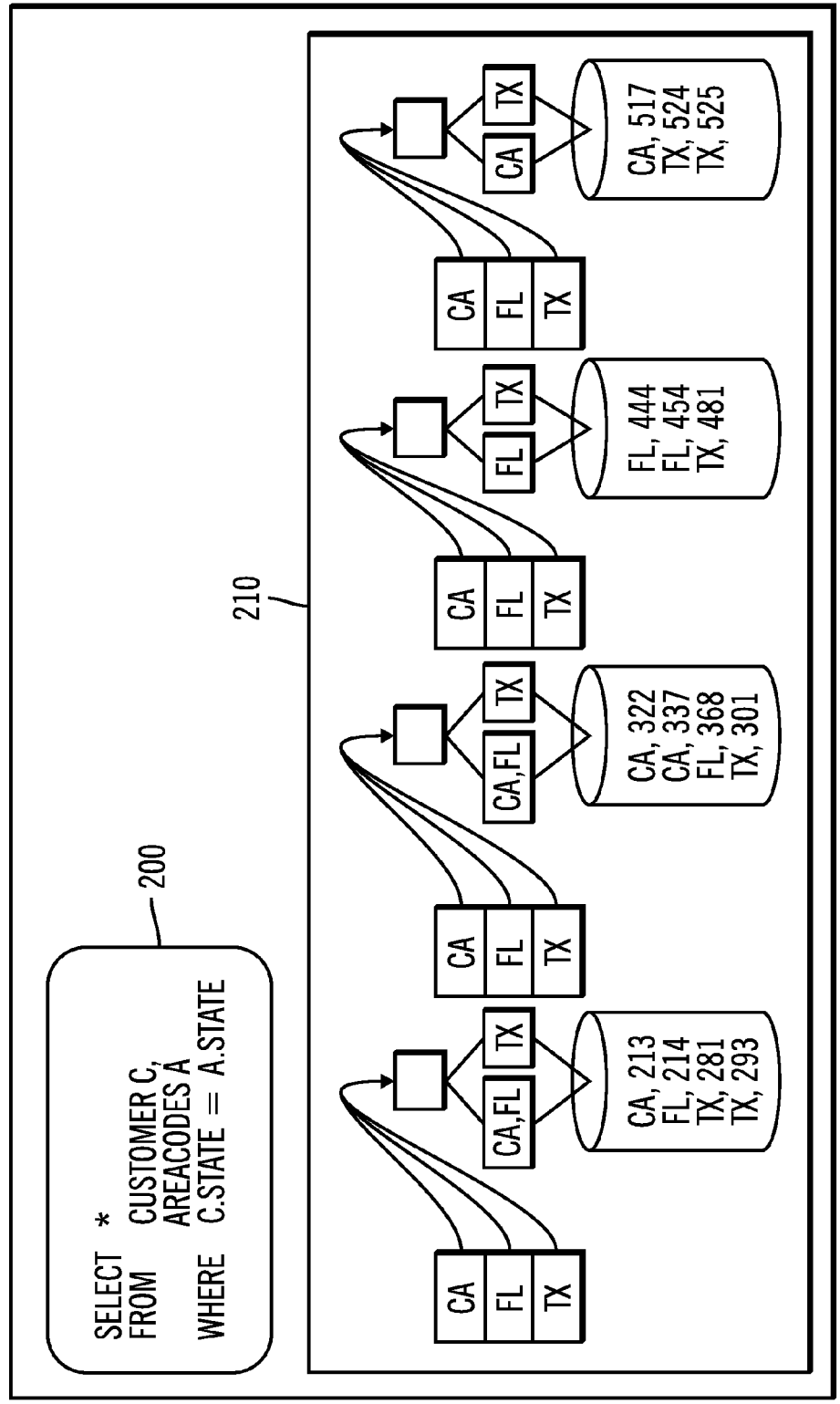
FIG. 2 illustrates performing a DPSI partition level join operation for an example query in accordance with certain embodiments.

FIG. 2 illustrates performing the DPSI partition level join operation 120 for an example query in accordance with certain embodiments. In FIG. 2, the query 200 performs a CUSTOMER table join to AREACODES table through a DPSI on AREACODES.STATE column. In the partitions 210, there is a child task corresponding to each partition of the AREACODES table. Each child task handles the join between the CUSTOMER table and one partition of the AREACODES table. With embodiments, each join performed by a child task is limited to touch index and data in its own partition. Any sequential pattern in index or data pages are preserved and continued within each partition. Random I/O across partitions is therefore avoided, Central Processing Unit (CPU) getpage calls are reduced, and overall query response time is further reduced by multiple joins running in parallel.

With embodiments, the outer/composite table is repeated for, or shared between, each parallel child task. In the example of FIG. 2, each child task reads all qualified rows from the CUSTOMER table. In certain embodiments, the overhead associated with repeated access to the outer/composite table may be minimized by applying all filtering specified in the query on the outer/composite table, sorting the outer/composite table into join order (for efficient access to the inner table), and storing the result in memory so that repeated access by each child task performs an in-memory scan of the shared copy of the outer/composite table rather than requiring I/O. With embodiments, any overhead associated with repeated access to the outer/composite table is more than compensated by the potential for significant reduction in random access to the inner table via the DPSI partitions.

For unclustered DPSIs, the DPSI partition level join operation 120 may extend to partition level hybrid join using the DPSIs. A difference of hybrid join compared with nested loop join is that Row Identifiers (RIDs) are accumulated from each index probe and data access is deferred until all index RIDs are retrieved. Once all RIDs are retrieved from each inner DPSI probe, these RIDs are sorted into data page order and list prefetch employed so that the data page access is sequential. Since the DPSI partition level join operation 120 accesses each partition in its own separate parallel task, the accumulated RIDs do not cross partition boundaries, and each child task can operate independently, either serially or in parallel.

For partitioned tables without sufficient indexes to support nested loop or hybrid joins, each inner table partition may also be materialized separately to support partition level hash or merge-scan join. In each case, the outer/composite table is repeated for each inner partition. Given that each parallel child task processes one partition, but repeats the entire outer/composite, then each child task operates as a partition level 2-table join. Each partition may choose to materialize the inner partition for partition level merge-scan or hash join. To avoid materializing the inner partition, the DBMS may flip the join sequence and materialize the outer/composite and use that as the inner table of hash join, and, therefore, the larger partition becomes the composite and is scanned without the requirement for index processing. The ability to flip the join sequence is not generally available for left-tree deep join permutation logic. Employing this technique may avoid materialization of large partitions, especially when the outer/composite is of a smaller size and materialization is less resource intensive. The same approach of materializing the outer/composite into memory for efficient DPSI partition level nested loop join also applies if the join order is flipped and the (smaller) outer/composite is materialized as the inner. This inner materialized result may then be shared by partition level (merge scan or hash) joins that are now driven by the partitions as outer tables. These partition level joins can also operate in parallel.

Figure 3:
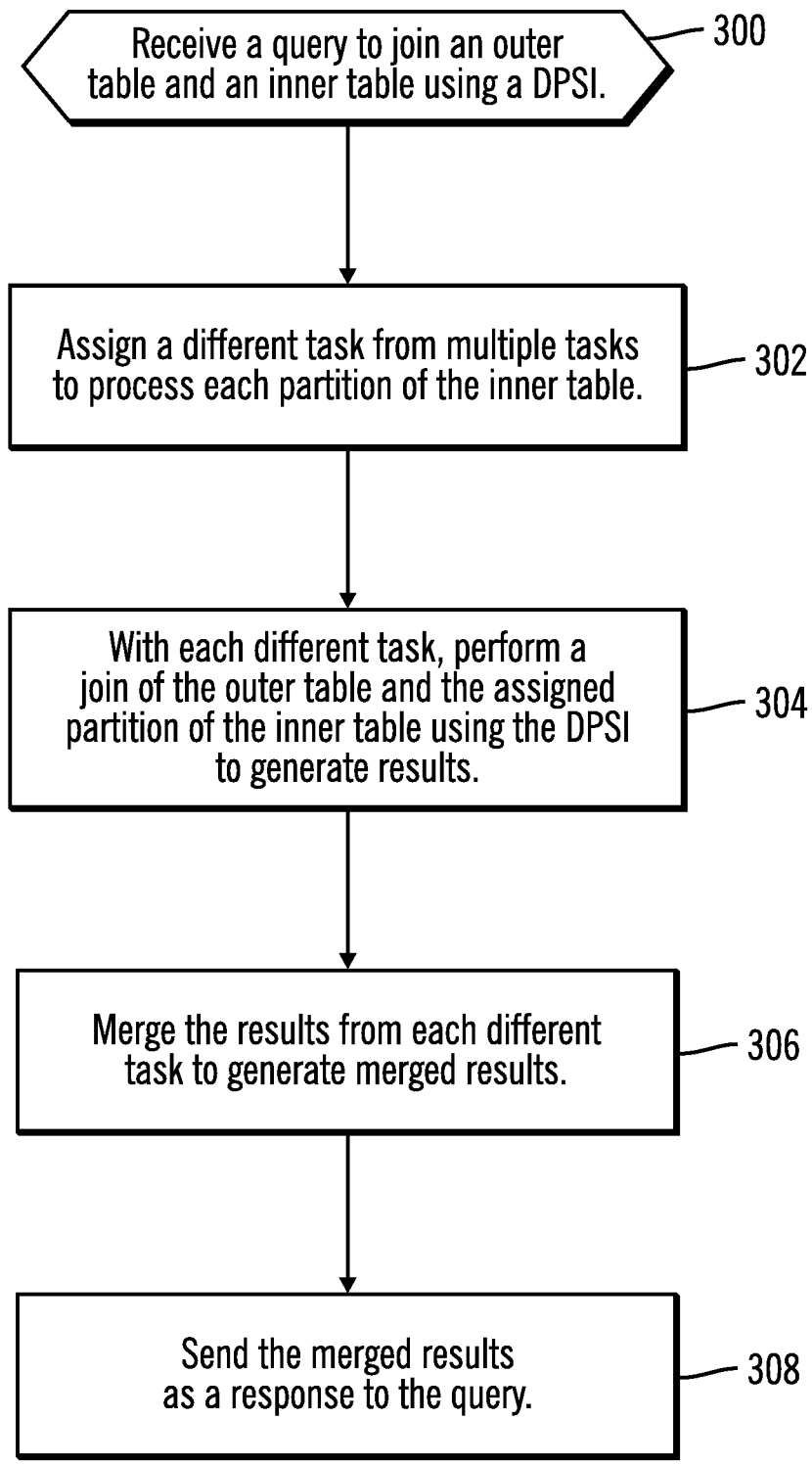
FIG. 3 illustrates, in a flow diagram, operations for performing a DPSI partition level join operation in accordance with certain embodiments.

FIG. 3 illustrates, in a flow diagram, operations for performing a DPSI partition level join operation 120 in accordance with certain embodiments. Control begins at block 300 with the RDBMS 110 receiving a query to join an outer table and an inner table using a DPSI. In block 302, the RDBMS 110 assigns a different task from multiple tasks to process each partition of the inner table. In certain embodiments, these different tasks are child tasks of the join operation. In block 304, each task performs a join of the outer table and the assigned partition of the inner table using the DPSI to generate results. In block 306, the RDBMS 110 merges the results from each task to generate merged results. In block 308, the RDBMS 110 sends the merged results as a response to the query.

Thus, embodiments improve query performance involving DPSIs.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
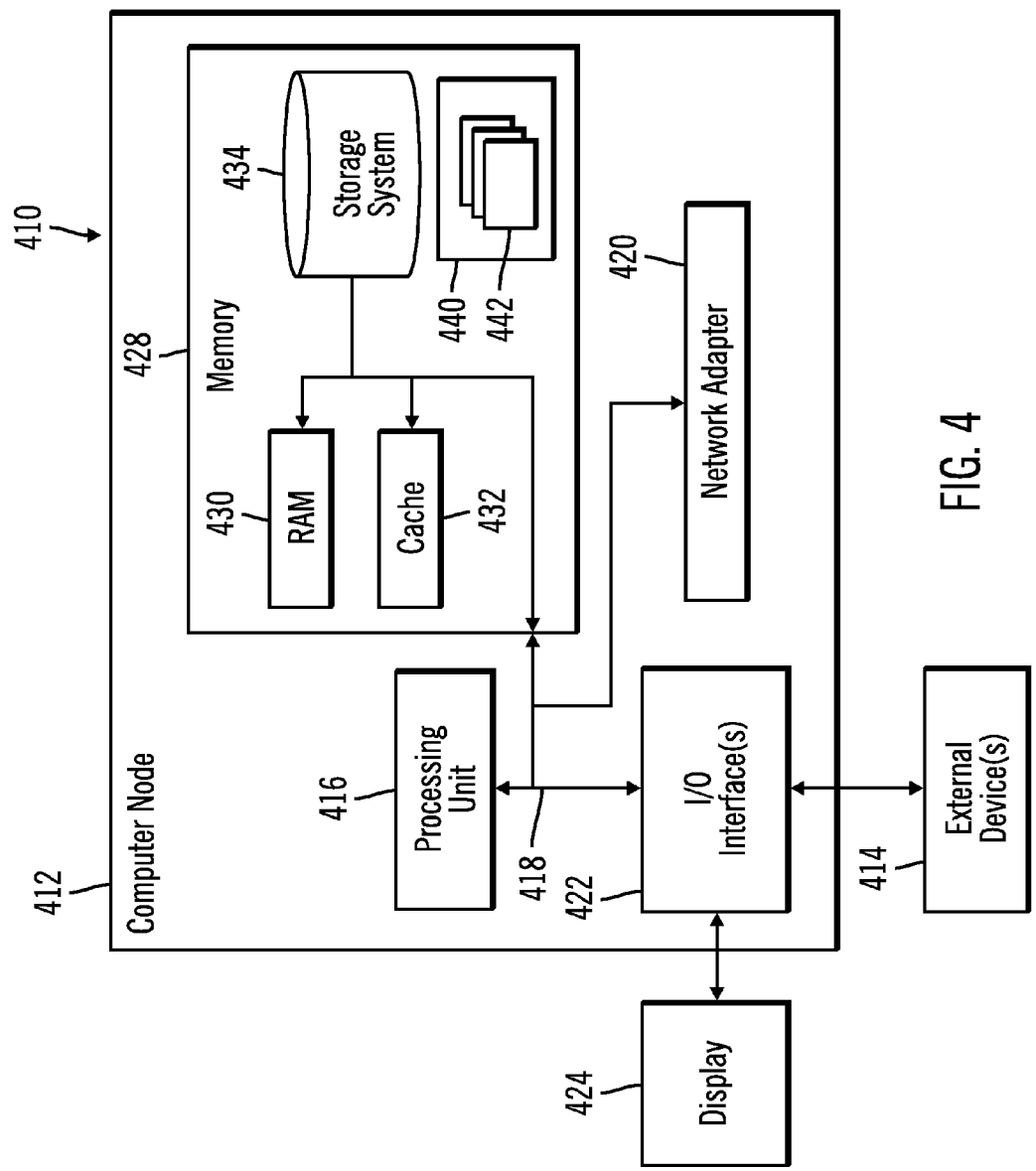
FIG. 4 illustrates a cloud computing node in accordance with certain embodiments.

Referring now to FIG. 4, a schematic of an example of a cloud computing node is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
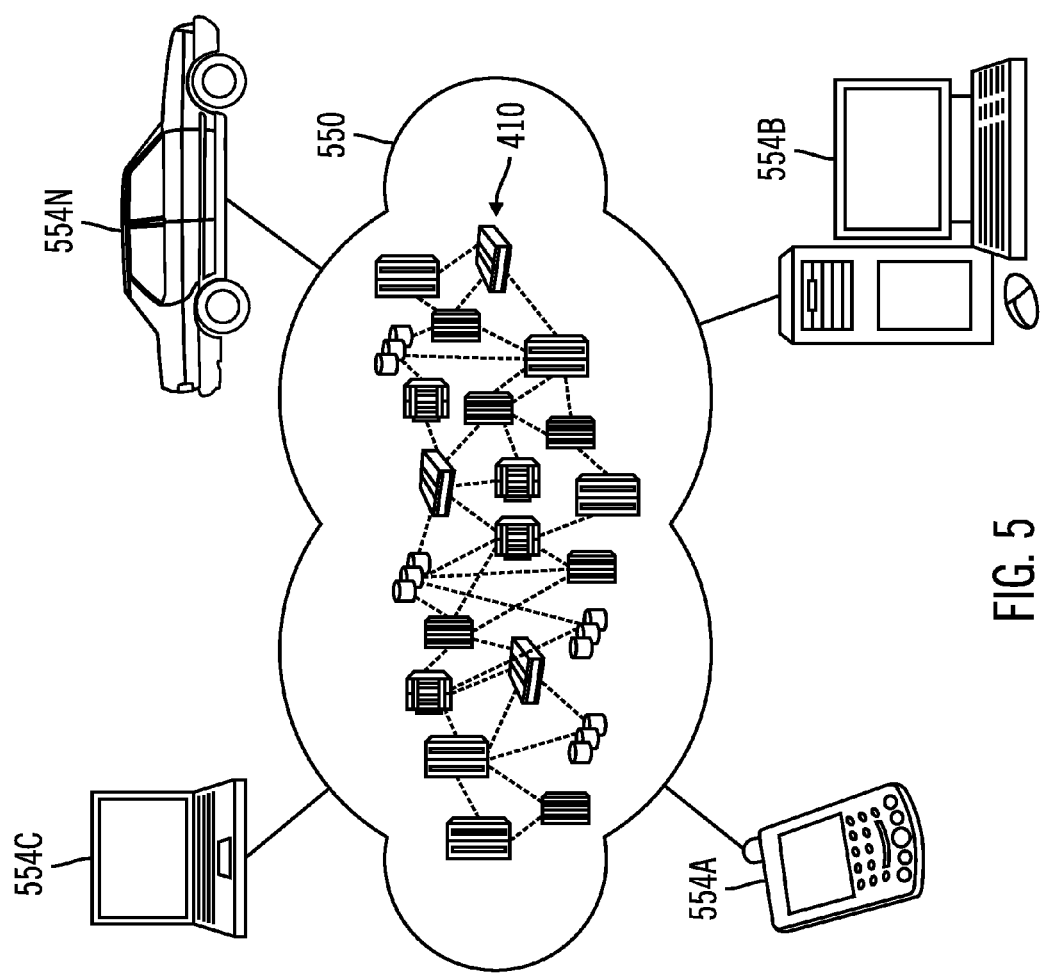
FIG. 5 illustrates a cloud computing environment in accordance with certain embodiments.

Referring now to FIG. 5, illustrative cloud computing environment 550 is depicted. As shown, cloud computing environment 550 comprises one or more cloud computing nodes 410 with which local computing devices used by cloud consumers, such as, for example, personal digital assistant (PDA) or cellular telephone 554A, desktop computer 554B, laptop computer 554C, and/or automobile computer system 554N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 410 and cloud computing environment 550 can communicate with any type of computerized device over any type of network and/or network addressable connection (e.g., using a web browser).

Figure 6:
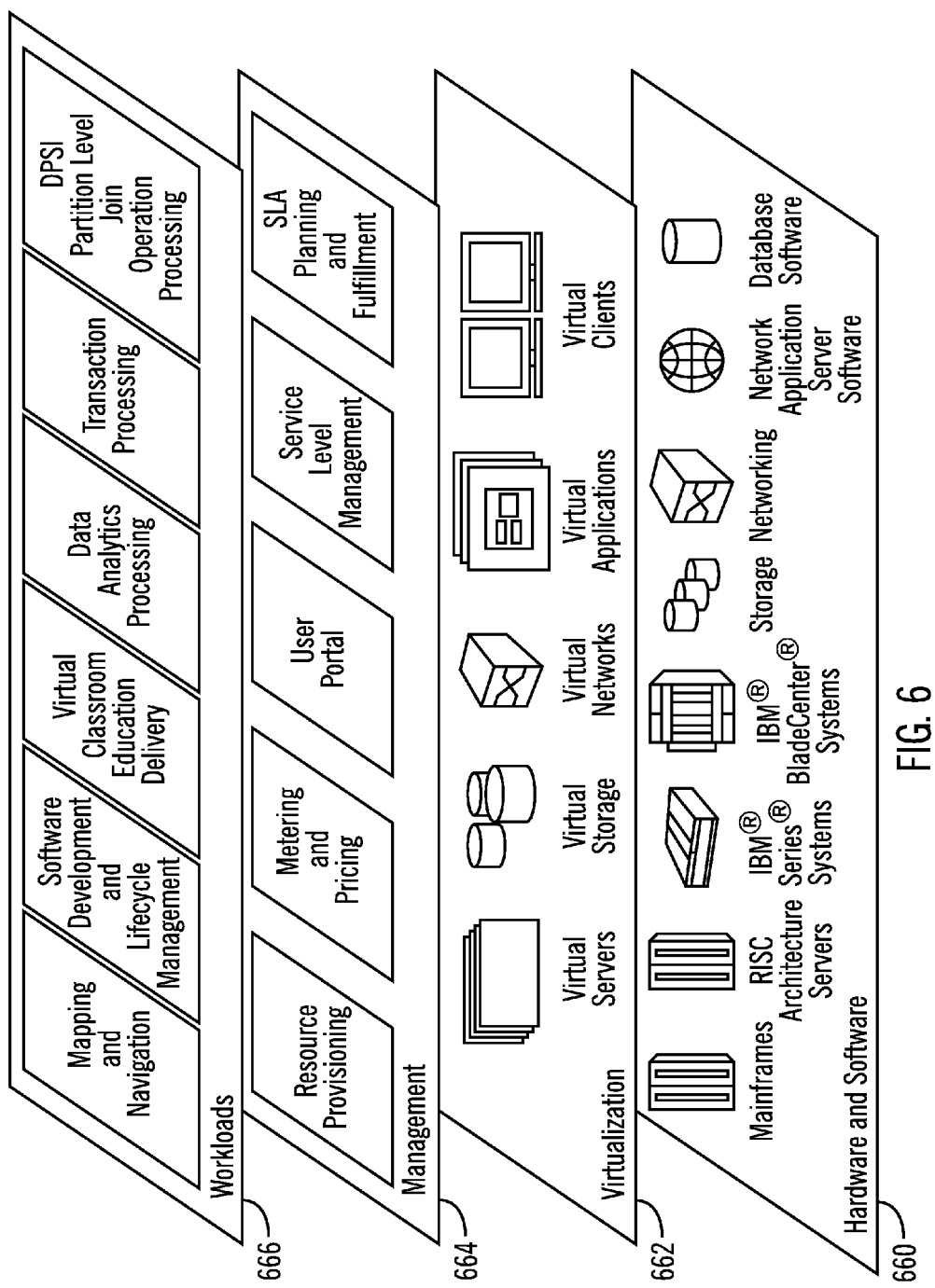
FIG. 6 illustrates abstraction model layers in accordance with certain embodiments.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and DPSI partition level join operation processing.

Thus, in certain embodiments, software or a program, implementing a DPSI partition level join operation in accordance with embodiments described herein, is provided as a service in a cloud environment.

In certain embodiments, the server computer 100 has the architecture of computing node 410. In certain embodiments, the server computer 100 is part of a cloud environment. In certain alternative embodiments, the server computer 100 is not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, comprising:
receiving, with a processor of a computer, a query that identifies an outer table and an inner table, wherein the inner table comprises multiple partitions;
performing a join of the outer table and the multiple partitions of the inner table using a Data-Partitioned Secondary Index (DPSI), wherein the DPSI comprises a group of indexes with each of the indexes in the group created for a different partition of the multiple partitions of the inner table, by:
assigning a different task from multiple tasks to each different partition of the multiple partitions of the inner table, wherein each of the multiple tasks is a child task of the join;
processing the outer table by:
applying filtering specified in the query;
sorting the out table into join order; and
storing the outer table in memory for shared access by each of the multiple tasks;
in response to the DPSI being clustered, performing a DPSI partition level join by executing each different task to perform a join of the outer table in memory and the different partition of the inner table using the DPSI to generate results, wherein the join of the outer table to each different partition of the inner table preserves sequential pre-fetch and index look-aside while accessing that different partition of the inner table;
in response to the DPSI being unclustered, performing a partition level hybrid join by executing each different task to perform a join of the outer table in memory and the different partition of the inner table using the DPSI to generate results by:
accumulating Row Identifiers (RIDs) from each inner DPSI index probe;
sorting the RIDs into data page order; and
employing list prefetch so that data page access is sequential;
merging the results from each different task; and
returning the merged results as a response to the query.

2. The method of claim 1, further comprising:
performing a nested loop join for a new query.

3. The method of claim 1, further comprising:
flipping a join sequence by materializing an outer table of a new query and using the outer table as an inner table of a hash join.

4. The method of claim 1, wherein the multiple tasks are performed in parallel.

5. The method of claim 1, wherein a Software as a Service (SaaS) is configured to perform method operations.

6. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
receiving a query that identifies an outer table and an inner table, wherein the inner table comprises multiple partitions;
performing a join of the outer table and the multiple partitions of the inner table using a Data-Partitioned Secondary Index (DPSI), wherein the DPSI comprises a group of indexes with each of the indexes in the group created for a different partition of the multiple partitions of the inner table, by:
assigning a different task from multiple tasks to each different partition of the multiple partitions of the inner table, wherein each of the multiple tasks is a child task of the join;
processing the outer table by:
applying filtering specified in the query;
sorting the out table into join order; and storing the outer table in memory for shared access by each of the multiple tasks;

in response to the DPSI being clustered, performing a DPSI partition level join by executing each different task to perform a join of the outer table in memory and the different partition of the inner table using the DPSI to generate results, wherein the join of the outer table to each different partition of the inner table preserves sequential pre-fetch and index look-aside while accessing that different partition of the inner table;

in response to the DPSI being unclustered, performing a partition level hybrid join by executing each different task to perform a join of the outer table in memory and the different partition of the inner table using the DPSI to generate results by:
accumulating Row Identifiers (RIDs) from each inner DPSI index probe;
sorting the RIDs into data page order; and
employing list prefetch so that data page access is sequential;

merging the results from each different task; and
returning the merged results as a response to the query.

7. The computer system of claim 6, wherein the operations further comprise:
performing a nested loop join for a new query.

8. The computer system of claim 6, wherein the operations further comprise:
flipping a join sequence by materializing an outer table of a new query and using the outer table as an inner table of a hash join.

9. The computer system of claim 6, wherein the multiple tasks are performed in parallel.

10. The computer system of claim 6, wherein a Software as a Service (SaaS) is configured to perform system operations.

11. A computer program product, the computer program product comprising a computer readable storage medium having program code embodied therewith, the program code executable by at least one processor to perform:
receiving a query that identifies an outer table and an inner table, wherein the inner table comprises multiple partitions;
performing a join of the outer table and the multiple partitions of the inner table using a Data-Partitioned Secondary Index (DPSI), wherein the DPSI comprises a group of indexes with each of the indexes in the group created for a different partition of the multiple partitions of the inner table, by:

assigning, by the at least one processor, a different task from multiple tasks to each different partition of the multiple partitions of the inner table, wherein each of the multiple tasks is a child task of the join;

processing, by the at least one processor, the outer table by:
applying filtering specified in the query;
sorting the out table into join order; and
storing the outer table in memory for shared access by each of the multiple tasks;

in response to the DPSI being clustered, performing a DPSI partition level join by executing, by the at least one processor, each different task to perform a join of the outer table in memory and the different partition of the inner table using the DPSI to generate results, wherein the join of the outer table to each different partition of the inner table preserves sequential pre-fetch and index look-aside while accessing that different partition of the inner table;

in response to the DPSI being unclustered, performing, by the at least one processor, a partition level hybrid join by executing each different task to perform a join of the outer table in memory and the different partition of the inner table using the DPSI to generate results by:
accumulating Row Identifiers (RIDs) from each inner DPSI index probe;
sorting the RIDs into data page order; and
employing list prefetch so that data page access is sequential;

merging, by the at least one processor, the results from each different task; and
returning, by the at least one processor, the merged results as a response to the query.

12. The computer program product of claim 11, wherein the program code is executable by the at least one processor to perform:
performing a nested loop join for a new query.

13. The computer program product of claim 11, wherein the program code is executable by the at least one processor to perform:
flipping, by the at least one processor, a join sequence by materializing an outer of a new query table and using the outer table as an inner table of a hash join.

14. The computer program product of claim 11, wherein a Software as a Service (SaaS) is configured to perform computer program product operations.

15. The computer program product of claim 11, wherein the multiple tasks are performed in parallel.

\* \* \* \* \*